Patented Oct. 8, 1946

2,408,834

REISSUED

UNITED STATES PATENT OFFICE 2,408,834

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,758

5 Claims. (Cl. 260—239.5)

The invention relates to new steroidal sapogenin type compounds and methods for obtaining the same.

I have obtained for the first time the heretofore unknown steroidal sapogenin compound hereinafter referred to as rockogenin which has the following structural formula.

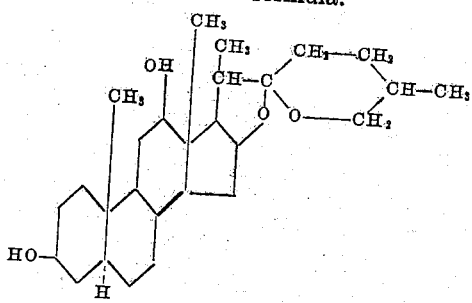

I have also obtained for the first time other heretofore unknown steroidal sapogenin compounds which are structurally related to rockogenin wherein the groups at $C_3$ and $C_{12}$ may be =O, $$\begin{matrix} OH \\ \diagdown \\ H \end{matrix}$$

and groups hydrolyzable to $$\begin{matrix} OH \\ \diagdown \\ H \end{matrix}$$

The new compounds of the invention have the following general formula,

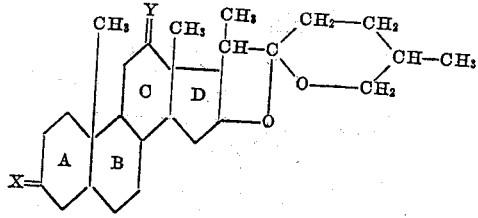

where X and Y are members of the class =O, $$\begin{matrix} OH \\ \diagdown \\ H \end{matrix}$$

and groups hydrolyzable to $$\begin{matrix} OH \\ \diagdown \\ H \end{matrix}$$

These compounds are new valuable starting materials for the preparation of physiologically active steroidal compounds of the type derived from the mammalian suprarenal cortex which have an oxygen containing group in ring C of the cyclopentanopolyhydrophenanthrene nucleus.

GENERAL PROCEDURE FOR OBTAINING A SAPOGENIN FRACTION

In obtaining the new compounds, the plant or part of the same which is to be extracted is cut up, ground or shredded and then extracted either with hot water or a lower aliphatic alcohol such as ethyl alcohol.

The plant may be dried before extraction, but I prefer to extract the plant without any preliminary drying. I also prefer to use an alcohol solvent such as ethanol or about 95% hot aqueous ethanol. For example, if one has about 25 kilograms of undried and cut up parts of the plants, such as stems, soft roots, leaves or fruit, these can be covered over with about 32 liters of 95% ethanol and heated under a reflux condenser at moderate steam bath temperature for about 12 hours. The hot extract can then be strained through cheese cloth, the filter cake washed with two 7-liter portions of hot ethanol and then squeezed dry. The extract and wash alcohol can be evaporated to a syrup and the syrup concentrated by passing a current of air over its surface. When using hot water as the extracting agent, the evaporation takes place much more slowly.

After evaporation, the concentrate containing saponins and like combinations of the steroidal sapogenins must be hydrolyzed in order to liberate the sapogenins. This is best accomplished by aqueous or alcoholic strong mineral acid. For example, the above mentioned concentrate from 25 kg. of plant material can be hydrolyzed by refluxing it for 2 hours with 3 liters of 2N ethanolic hydrochloric acid. The reaction mixture is cooled and filtered. If any considerable tar is present at this stage, it can be ground and digested several times with an equal volume of hot alcohol. The combined alcoholic filtrates are diluted with 20 liters of diethyl ether and the solution washed successively with water, 5% sodium hydroxide and water and evaporated. Fatty esters in the residue thus obtained can be hydrolyzed by refluxing the residue with 3 volumes of 10% alcoholic potash for 30 minutes. The cooled mixture from the alkaline hydrolysis is extracted with ether and the ethereal solution washed with water and then evaporated to give a sapogenin fraction which is dissolved in acetone, treated with active charcoal such as the product known as "Norite" and filtered. The clarified filtered acetone solution contains the sapogenin fraction of the plant and can be separated from the acetone by evaporating the latter. Such sapogenin fractions consist of mixtures of sapogenins. The individual sapogenins are next isolated or separated out of this fraction.

The above description is a general procedure which I use for obtaining a sapogenin fraction or mixture. It is merely illustrative and is capable of considerable variation, as will be understood by those skilled in the art. Any known method for obtaining a sapogenin fraction by hydrolytic and solvent extraction procedures may be used, provided solvents are used which make possible the separation and isolation from the plant tissue of the greater part of the hydroxyl and ketone substituted steroidal sapogenins liberated by the hydrolytic steps.

*Example 1.—Hecogenin from Agave toumeyana Trel*

5 kg. of medium age plants of the species *Agave toumeyana* Trel., collected above the tunnel on route 60–70, east of Superior, Arizona, in November 1941, are treated by the above described general procedure in order to obtain a sapogenin fraction which consists largely of hecogenin, the starting material for the synthesis of rockogenin described in Example 2. The sapogenin fraction from ether is acetylated and crystallized from methanol-ethyl acetate to give plates of hecogenin acetate, M. P. 246–248°. Yield, 13 g.

Anal.: Calc'd for $C_{29}H_{44}O_5$: C, 73.7; H, 9.4.
Found: C, 73.4; H, 9.3.

The acetate is hydrolyzed and the product is crystallized from methanol, M. P. 265–268°.
Anal.: Calc'd for $C_{27}H_{42}O_4$: C, 75.3; H, 9.8.
Found: C, 75.0; H, 9.7.

*Example 2.—Synthesis of rockogenin from hecogenin*

(a) *By catalytic hydrogenation.*—An ethereal solution of 0.3 g. of hecogenin containing several drops of acetic acid is shaken with hydrogen and 0.2 g. of Adams catalyst for two hours at room temperature and three atoms. After filtering the solvent is removed. The oily residue is refluxed with acetic anhydride for one hour. The solvent is removed in vacuo on the steam bath and rockogenin diacetate is crystallized from methanol as long needles, M. P. 204–206°; yield, 0.12 g.
Anal.: Calc'd for $C_{31}H_{48}O_6$: C, 72.1; H, 9.4.
Found: C, 71.9; H, 9.2.

When hydrolyzed with 5% alcoholic potassium hydroxide for twenty minutes on the steam bath, the diacetate is converted to the rockogenin which crystallizes from methanol as thick needles, M. P. 208–210°. Repeated crystallizations from ether gives material melting 217–220°.
Anal.: Calc'd for $C_{27}H_{44}O_4$: C, 75.0; H, 10.3.
Found: C, 74.5; H, 10.2.

(b) *By sodium-ethanol reduction.*—To a solution of 300 mg. of hecogenin in 100 cc. of absolute ethanol is added 7 g. of sodium in small strips over a period of thirty minutes. The mixture is cooled and poured into water. The precipitated solid is extracted with ether and the ethereal solution is washed with water, 10% hydrochloric acid and water. The ethereal solution is concentrated and cooled to give white crystals, M. P. 233–244°, wt. 160 mg. Recrystallization from ether gives starting material melting 260–262°; a Anal.: Calc'd for $C_{27}H_{42}O_4$: C, 75.3; H, 9.8.
Found: C, 74.9; H, 9.8.

The first mother liquor is evaporated to dryness. The residue is crystallized from methanol as white crystals, M. P. and mixed M. P. with rockogenin from (a), 209–210°; yield 80 mg.
Anal.: Calc'd for $C_{27}H_{44}O_4$: C, 75.0; H, 10.3.
Found: C, 74.9; H, 10.4.

The diacetate is prepared with boiling acetic anhydride and the product is crystallized from methanol as white needles, M. P. and mixed M. P. with rockogenin diacetate from (a), M. P. 205–207°.
Anal.: Calc'd for $C_{31}H_{48}O_6$: C, 72.1; H, 9.4.
Found: C, 72.2; H, 9.4.

(c) *Rockogenin acetate from hecogenin acetate.*—An ethereal solution of 0.5 g. of the acetate of hecogenin is shaken with hydrogen and Adams catalyst as described above. Rockogenin 3-monoacetate crystallizes from methanol as white plates, M. P. 211–213°.
Anal.: Calc'd for $C_{29}H_{46}O_5$: C, 73.4; H, 9.8.
Found: C, 73.8; H, 9.7.

When refluxed with acetic anhydride for one hour it forms rockogenin diacetate, M. P. and mixed M. P., 203–205.

*Example 3.—Synthesis of hecogenone*

(a) *From hecogenin.*—A solution of 0.1 g. of hecogenin in 30 cc. of acetic acid is mixed with a solution of 0.1 g. of chromic anhydride in 5 cc. of 80% acetic acid. After standing thirty minutes at 25°, water is added and the product is ether extracted. An alkali wash of the ethereal solution followed by acidification of the aqueous layer gives no acid fraction. The ethereal solution is concentrated and cooled to give white needles of hecogenone, M. P. 237–240°.
Anal.: Calc'd for $C_{27}H_{40}O_4$: C, 75.7; H, 9.4.
Found: C, 75.5; H, 9.4.

(b) *From rockogenin.*—The above mother liquor from the preparation of rockogenin by catalytic reduction of hecogenin described under Example 2 (a) is evaporated to dryness. The residue dissolved in 25 cc. of acetic acid is oxidized with a solution of 0.15 g. of chromic anhydride in 10 cc. of 80% acetic acid for thirty minutes at 20°. The product is isolated as described above and crystallized from ether as white needles, M. P. and mixed M. P. with hecogenone, 237–240°; yield 0.1 g.
Anal.: Calc'd for $C_{27}H_{40}O_4$: C, 75.7; H, 9.4.
Found: C, 75.5; H, 9.4.

Hecogenone has the folowing structural formula.

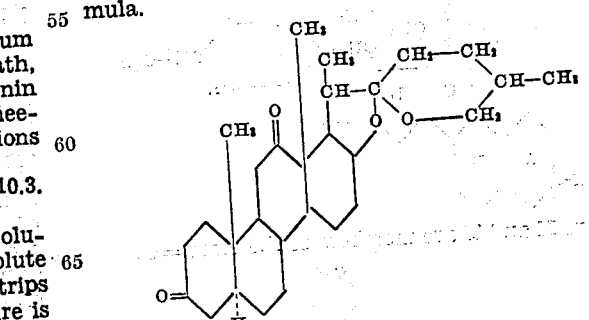

Ring dihydroxy compounds, such as rockogenin, can be diacylated at the ring hydroxyls and then partially saponified to obtain a mono-acylated hydroxy derivative which can then be oxidized with chromic acid at the free hydroxyl to give the corresponding monoacylated ketone. The latter acylated ketone upon hydrolysis gives the free hydroxy ketone. Also, instead of diacylating and then partially saponifying, one can partially acylate the dihydroxy compounds of the general formula to get a mono-hydroxy monoacylate compound, which can then be oxidized (e. g. with chromic acid) to the corresponding monoacylated ketone. The monoacylated ketone can be hydrolyzed to the free hydroxy ketone, for example by methanolic potassium hydroxide.

What I claim is:

1. A $C_{12}$-substituted steroidal sapogenin of the formula,

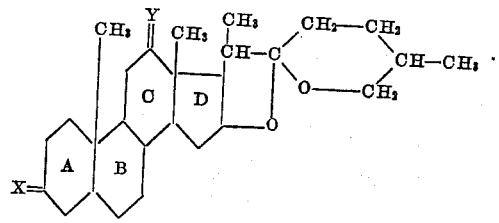

where X and Y are members of the class $=O$, $$\begin{matrix} OH \\ | \\ H \end{matrix}$$

and ester groups hydrolyzable to $$\begin{matrix} OH \\ | \\ H \end{matrix}$$

2. A $C_{12}$-keto steroidal sapogenin of the formula,

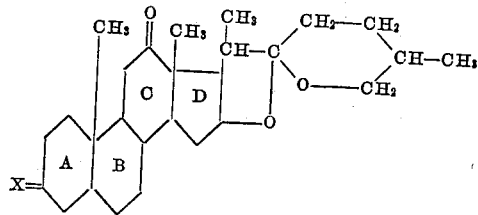

where X is a member of the class $=O$, $$\begin{matrix} OH \\ | \\ H \end{matrix}$$

and ester groups hydrolyzable to $$\begin{matrix} OH \\ | \\ H \end{matrix}$$

3. The new steroidal sapogenin, rockogenin, of the formula,

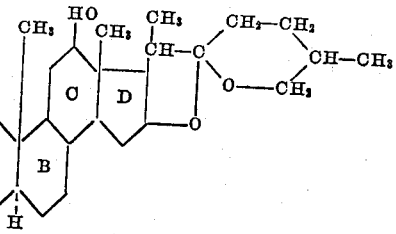

4. The new steroidal sapogenin compound having the formula,

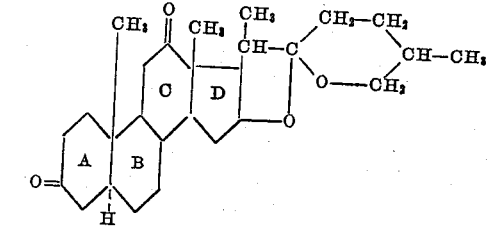

5. The method of synthesizing rockogenin which comprises reducing hecogenin having the formula

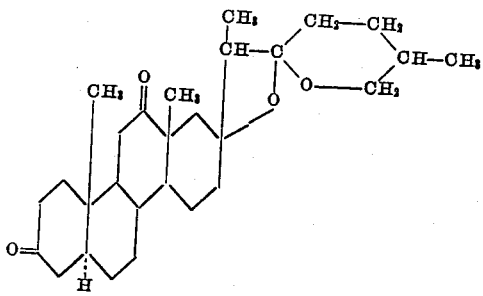

ROMEO B. WAGNER.